May 12, 1970 F. BECK ET AL 3,511,765
CARRYING OUT ELECTROCHEMICAL REACTIONS
Filed July 8, 1966 6 Sheets-Sheet 1

INVENTORS:
FRITZ BECK
HANS LEITNER
HARALD GUTHKE
KARL WINTERSBERGER
BY
*Marzall, Johnston, Cook & Root*
ATT'YS

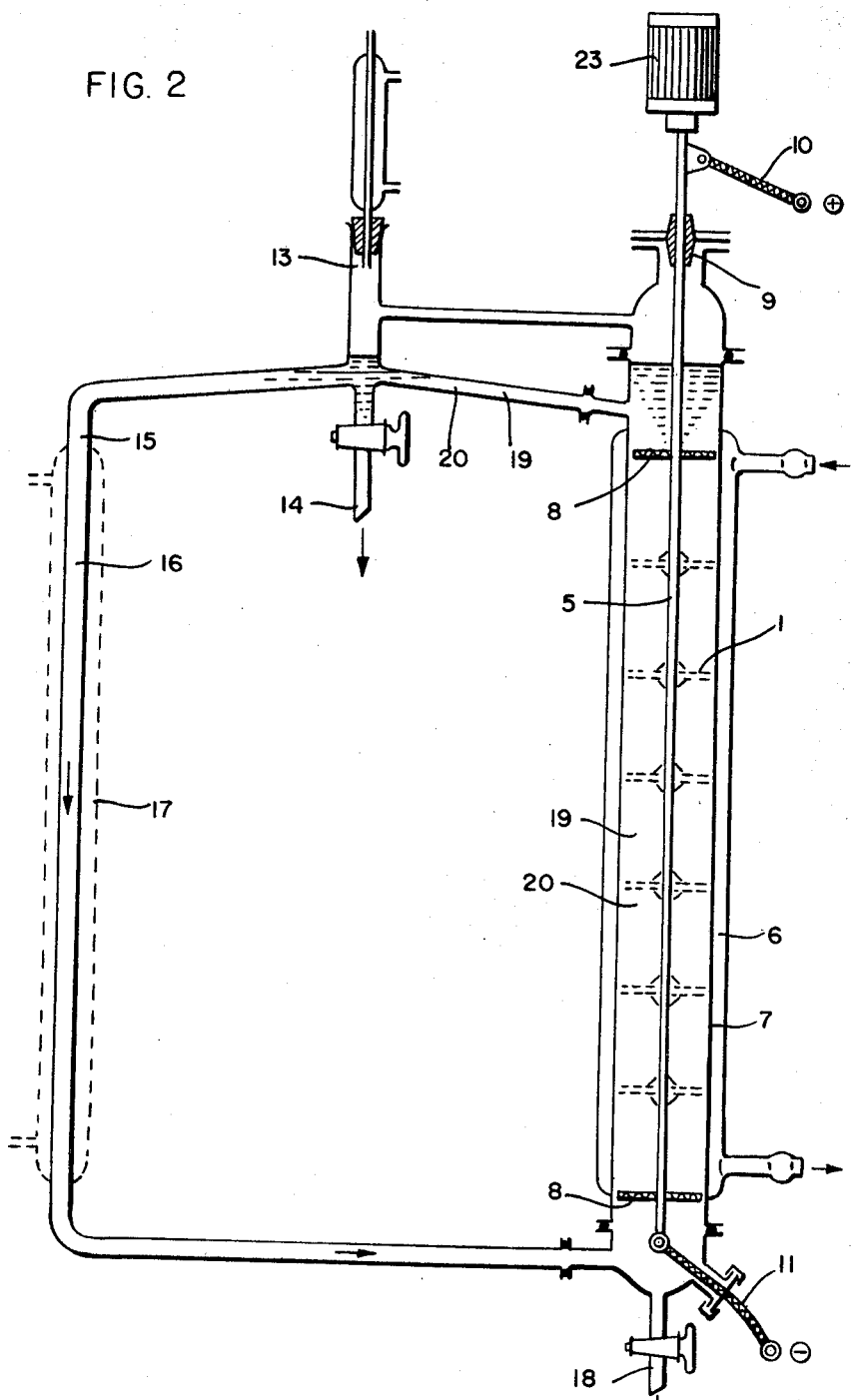

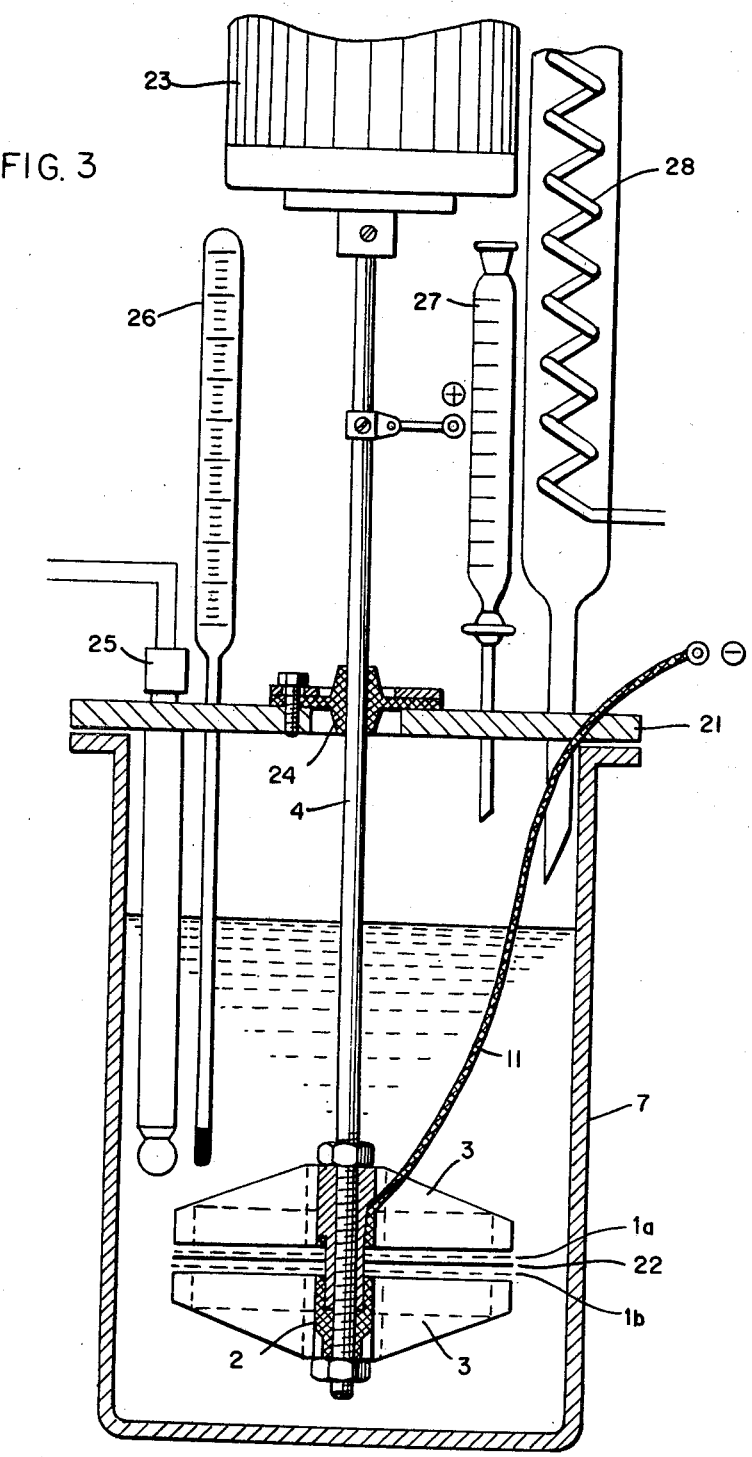

May 12, 1970
F. BECK ET AL
3,511,765
CARRYING OUT ELECTROCHEMICAL REACTIONS

Filed July 8, 1966

INVENTORS:
FRITZ BECK
HANS LEITNER
HARALD GUTHKE
KARL WINTERSBERGER

United States Patent Office 3,511,765
Patented May 12, 1970

3,511,765
CARRYING OUT ELECTROCHEMICAL REACTIONS
Fritz Beck and Hans Leitner, Ludwigshafen (Rhine), Harald Guthke, Frankenthal, Pfalz, and Karl Wintersberger, Ludwigshafen (Rhine), Germany, assignors to Badische Anilin- & Soda-Fabrik Aktiengesellschaft, Ludwigshafen (Rhine), Germany
Filed July 8, 1966, Ser. No. 563,794
Claims priority, application Germany, July 9, 1965, B 82,757; Jan. 13, 1966, 1,571,720
Int. Cl. B01k 3/00
U.S. Cl. 204—222      13 Claims

ABSTRACT OF THE DISCLOSURE

An electrolytic cell for carrying out an electrochemical reaction in the liquid phase having at least one pair of parallel liquid-permeable electrodes arranged transversely within said cell for passage of a liquid electrolyte therethrough, the anode and cathode of each electrode pair being spaced apart by a distance of less than 1 mm. The electrode pairs can be vibrated or other means provided to produce a pulsating movement of the liquid electrolyte in its direction of flow through said paired electrodes. This cell is particularly useful for the electrochemical hydrodimerization of acrylonitrile into adiponitrile.

---

This invention relates to a new apparatus for carrying out electrochemical reactions. The invention also relates to a new process for carrying out electrochemical reactions.

Electrolytic cells in which the electrodes are spaced apart at a distance of several millimeters to several centimeters have hitherto been used for carrying out electrochemical reactions of organic and inorganic compounds. The electrolyte is moved by stirring or recirculation during the reaction and preferably flows parallel to the surfaces of the electrodes. The electrodes are used in the form of plane or cylindrical metal sheets, rods, wires or cloth, the electrode surface desired for the particular purpose determining the type chosen.

This conventional arrangement has a number of disadvantages. The space-time yield is unsatisfactory, the waste of electrical energy, particularly by development of Joule's heat in the electrolyte, is considerable. High current densities can only be achieved by the use of high ion concentrations in the electrolytes. In the case of electrochemical reactions which are carried out using conducting salts, high ion concentrations often affect the solubility of the organic substance in the electrolyte in an unfavorable way (salting out effect), and there is a further limitation in the choice of the conducting salt by the high solubility thereof in the electrolyte which is required. High concentrations of ions moreover make the processing of the reaction mixture difficult and often result in undesirable electrochemical secondary reactions of the ions at the electrodes. Another disadvantage is the high viscosity of concentrated salt solutions.

It is an object of the present invention to provide an apparatus and a method for carrying out electrochemical reactions which enable electrochemical reactions to be carried out with good space-time yields, in which waste of electrical energy is kept to a minimum, in which high current densities may be achieved even with low ion concentrations and in which conducting salts having low solubility may be used.

These and other objects are achieved by an apparatus for carrying out electrochemical reactions in an electrolyte comprising one or more pairs of electrodes which are permeable to liquid, the electrodes being spaced apart at a distance of less than 1 mm. and being separated from each other if desired by a liquid-permeable insulator, and if desired comprising means for causing relative movement between the electrolyte and the pair or pairs of electrodes.

The new apparatus gives higher space-time yields in electrochemical reactions. Current losses by evolution of heat are low. High current densities may be achieved even when using low ion concentrations in the electrolytes. By reason of the low concentrations of conducting salts, high concentrations of organic substances may be used in the electrolytes. Electrochemical reactions may also be carried out using relatively sparingly soluble conducting salts or non-polar starting materials, such as hydrocarbons or esters. Low salt concentrations in the electrolytes facilitate the processing of the reaction mixture. The use of perchlorates (handling of which in high concentrations is not without risk) as conducting salts is also possible under these conditions. Another advantage of the new apparatus is the short residence time of the electrolysis mixture between the electrodes. This is particularly advantageous when the components are sensitive to high temperatures and to acid or alkaline reaction media.

The electrodes of the new apparatus may be made in the form of wire cloth, screens, expanded metal, sintered articles or in other liquid-permeable form and are spaced apart at a distance of less than 1 mm., in general from 0.02 to 1 mm., preferably less than 0.5 mm., and especially at 0.05 to 0.2 mm. The surfaces of these electrodes will be termed macroscopic where electrode surfaces are intended which when the electrode body is viewed as a whole appear as surfaces of the form for example of wire cloth, screens or sintered articles. The fine structure of the actual surface is disregarded in the term macroscopic.

Fine mesh wire cloth, for example having 50 to 2000 meshes per square centimeter are preferably used. The small distance between the electrodes may be maintained in a particularly simple manner by keeping the electrodes apart by means of a liquid-permeable insulator. Suitable insulators are for example paper, woven or non-woven glass fiber cloth, porous plastic sheeting or ceramics.

Conventional materials are used for the electrodes in the new apparatus. For electrochemical reductions, cathodes are used which have a high hydrogen overvoltage, such as mercury, lead, alloys of mercury and lead, alloys of lead and thallium, cadmium, zinc and copper. Other suitable cathode materials which may serve at the same time as electrocatalysts are for example platinum, palladium, nickel, graphite or graphite activated with platinum.

Anodes are preferably chosen from the conventional corrosion-proof materials, such as platinum, platinum-iridium, platinum-rhodium, graphite or lead dioxide. Lead dioxide is deposited in the conventional way on wire cloth or a fine-mesh expanded metal support of platinum or nickel or of titanium or tantalum having a coating of nickel or a thin coating of platinum. Moreover, in alkaline media, all metals capable of being passivated, such as nickel, iron or alloy steel, may be used as anode material.

The electrodes are positioned substantially parallel to each other, preferably in the form of flat or only slightly curved surfaces, and may be arranged in any position, i.e., horizontally, vertically or inclined when the apparatus is in its normal position. In the simplest case, the apparatus comprises one pair of electrodes. Arrangements having a plurality of pairs of electrodes, for example up to one hundred pairs, are particularly suitable for continuous reactions.

In electrochemical reactions which may be carried out in the new apparatus it is essential that the electrolyte should flow therough the pairs of electrodes. Such a flow is often achieved by convection of the electrolyte due to the reaction heat, or it may be by convection resulting from disengagement of gas at the electrodes. In many cases it is advantageous however to use an apparatus which allows relative movement between the electrolyte and the pairs of electrodes. The apparatus should in particular permit the electrolyte to flow through the pairs of electrodes. The speed at which the electrolyte flows through the pairs of electrodes may vary within wide limits. In general speeds are chosen between 1 and 1000 cm./sec., particularly from 1 to 100 cm./sec. (i.e., at a speed of $a$ cm./sec., $a$ c.cm. of electrolyte flows per second through 1 sq. cm. of the macroscopic electrode surface). When the flow is not uniform, but for example intermittent, the speed of flow is defined as the average value of the absolute speeds. The flow may be caused for example solely by the means for supplying and withdrawing the electrolyte, provision being made to prevent the electrolyte from flowing around the electrodes instead of through them.

The electrolyte flows through the individual electrodes perpendicularly or substantially perpendicularly to the macroscopic surface of the electrode, i.e., the angle between the macroscopic surface and the direction of flow is preferably 90° but may deviate therefrom, but in any case not more than ±30°. To carry out the reaction, the electrolyte is in general circulated repeatedly through the pair of electrodes or through a series of pairs of electrodes (as shown in FIG. 6 of the accompanying drawings) until the reaction mixture has the desired concentration of reaction product, and if necessary cooling is applied and gases formed, such as hydrogen or oxygen, are separated by means of a gas separator. It is also possible however to pump the electrolyte continuously through a series of pairs of electrodes, if desired with the interposition of cooling zones between the individual pairs of electrodes, the starting mixture flowing through the first electrode pair and the whole or part of the reaction mixture leaving the last pair of electrodes being supplied to processing. When only part of the reaction mixture is withdrawn, the remainder may be recycled to the starting mixture.

The flow through the pairs of electrodes may be uniform in one direction or it may be pulsating. For this purpose the electrolyte may be given a pulsating movement, for example by the use of a moving piston or a vibratory mixer. An intense flow through the electrodes may also be achieved particularly advantageously by moving the pairs of electrodes, particularly by a pulsating movement. Since relatively short residence times of the electrolyte immediately at the surface of the electrodes are achieved owing to the oscillation of the electrodes, secondary reactions may be substantially decreased or wholly suppressed by the use of oscillating electrodes.

Movement of the pairs of electrodes may be effected by means of a vibrator, advantageously in an arrangement in which the pairs of electrodes are disposed perpendicularly on a vertical axis of the vibrator. This arrangement requires much less energy than other arrangements.

Frequency of pulsation may vary within wide limits both in the case of electrolytes having a pulsating flow and pairs of electrodes undergoing pulsating movement. The frequency is in general 1 to 1000, preferably 10 to 100, cycles per second. The amplitude of the oscillations is preferably 0.1 to 3 mm., particularly 0.3 to 1.5 mm.

If the double electrodes are circular in shape, the vibrator axis is advantageously passed through the midpoint of the circular electrodes for reasons of symmetry. The electrodes are forced toward one another and held in position by means of members having the shape of a spoked wheel of the same diameter and being made of plastic, for example polypropylene. A plurality of pairs of electrodes may be arranged one above the other on a single vibrator axis, and the sections of the vibrator axis lying between them may be used as electrical connections for series connection of the pairs of electrodes. A single connecting lead at the beginning and end of the axis is then sufficient. This arrangement of $n$ pairs of elecrodes connected in series in the same electrolyte, which is very favorable electrically, is only possible with the arrangement according to this invention. The ratio of the spacing of the electrodes to the spacing of the pairs of electrodes is extreme, namely 1:100 to 1:1000 so that the fact that the cathode at higher potential can function as an anode with respect to the cathode at lower potential, is not critical.

The invention will now be described with reference to the accompanying drawings which illustrate various embodiments of the invention.

FIG. 1b is a plan view of a single electrode, as viewed in the direction of the arrows in FIG. 1a.

FIG. 2 is a partially schematic view of continuous apparatus, containing a number of electrodes according to the invention.

FIG. 3 is a partially schematic cross sectional view of a discontinuous apparatus containing a pair of vibrating electrodes.

Figure 1A:
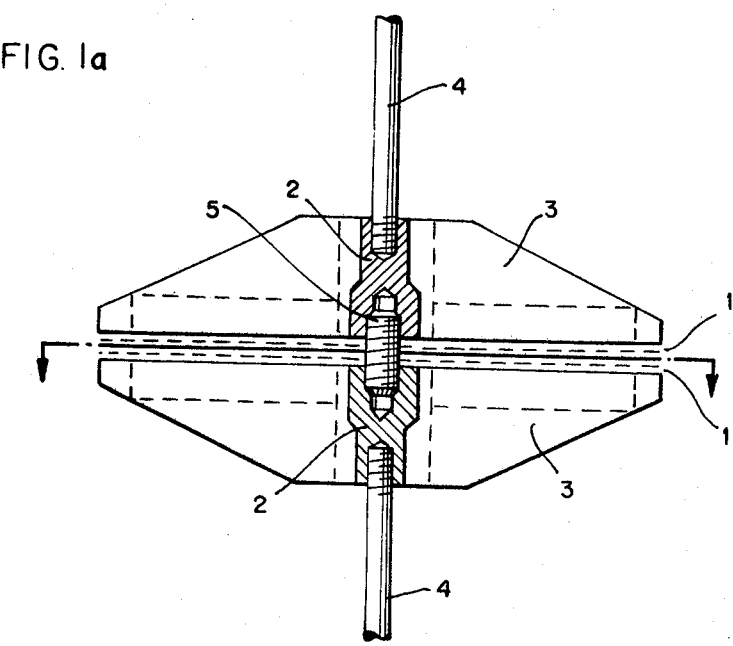
FIG. 1a is a cross section through a pair of electrodes according to the invention.
Figure 1B:
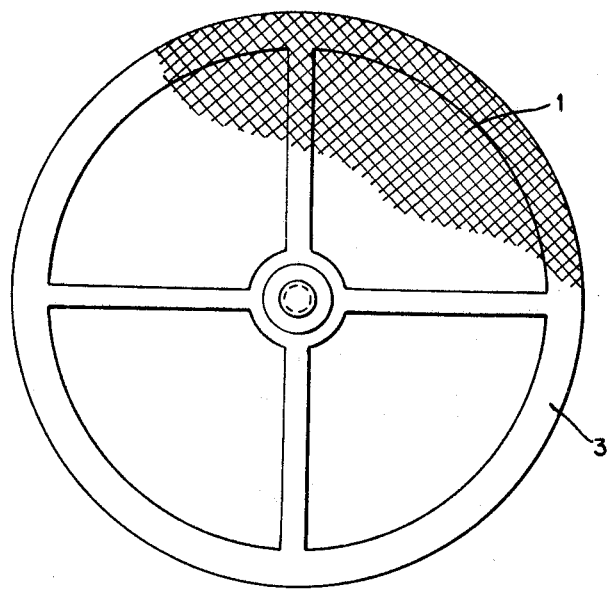

The disposition of a pair of electrodes may be for example as indicated in the plan view and elevation in FIG. 1. In this arrangement current is supplied to electrode cloth 1 through metal sleeves 2 which are pressed coaxially into members 3 made of plastic in the shape of a spoked wheel. Mechanical and electrical connection to the next pair of electrodes is provided by sections 4 of the axis. A plastic grub screw 5 connects the two halves of the pair of electrodes and at the same time provides electrical insulation between them.

For continuous operation, an arrangement may be used for example of the type shown in FIG. 2. A plurality of pairs of electrodes 1 are disposed one above another on an axis 5 of a vibrator 23 within a vertical tube 7 provided with a cooling jacket 6, so that they oscillate therein. Waste heat created by the electrolysis is removed on the spot by way of the cooling jacket 6. The spacing of the electrode pairs depends on the amount of heat produced during electrolysis and on the cooling efficiency. Pumping discs 8 (having conical orifices in the conventional manner) are provided at each end of the axis 4 and provide a slow circulation of the reaction mixture without other pumps. The axis 4 of the vibrator enters the reactor through a sleeve 9 with which it makes a gastight fit. The pairs of electrodes are connected in series to the direct current supply via flexible leads 10 and 11. The pairs of electrodes may however be connected in parallel or a mixed circuit may be used. Gaseous reaction products may escape at 13 through a condenser. The reaction mixture, enriched with reaction product, is continuously withdrawn at 14 while starting material is supplied at the same time at 15. An additional heat exchanger 17 may be provided in the return pipe 16 if necessary. The plant may be emptied through a valve 18. The pH value is measured at the points 19 and the temperature is measured at the points 20, both being registered if desired. A base, such as triethylamine, or an acid, such as glacial acetic acid, may be added to the return pipe 16 to regulate the pH value.

Another embodiment, more useful for laboratory purposes, is diagrammatically shown in FIG. 3 in sectional elevation. A pair of circular electrodes 1 according to FIG. 1 separated by a liquid permeable insulator 22 is provided in an electrolytic cell 7 having a cover 21. A metal sleeve 2 forms the electrically conducting connection of the electrode 1 to the vibrator axis 4 acting as supply, or with the lead 11. The axis 4 secured to the vibrator 23 is introduced through a sleeve 24 with which it makes a gastight fit into the electrolytic cell 7. The apparatus is also provided with a glass electro 25, a thermometer 26, a dropping funnel 27 and a reflux condenser 28.

Figure 4:
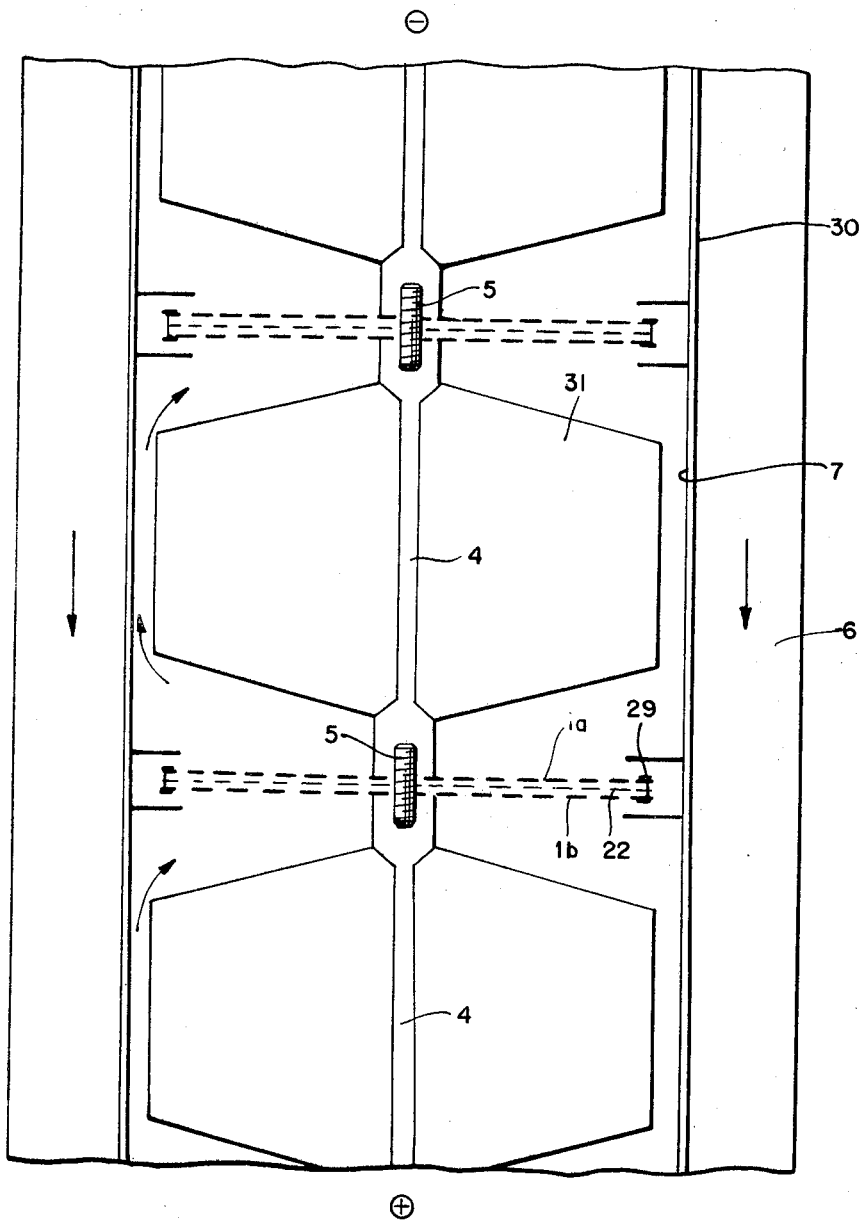
FIG. 4 is a partially schematic view over a cutaway length of an electrolytic cell containing a plurality of vibrating electrodes.
Figure 5:
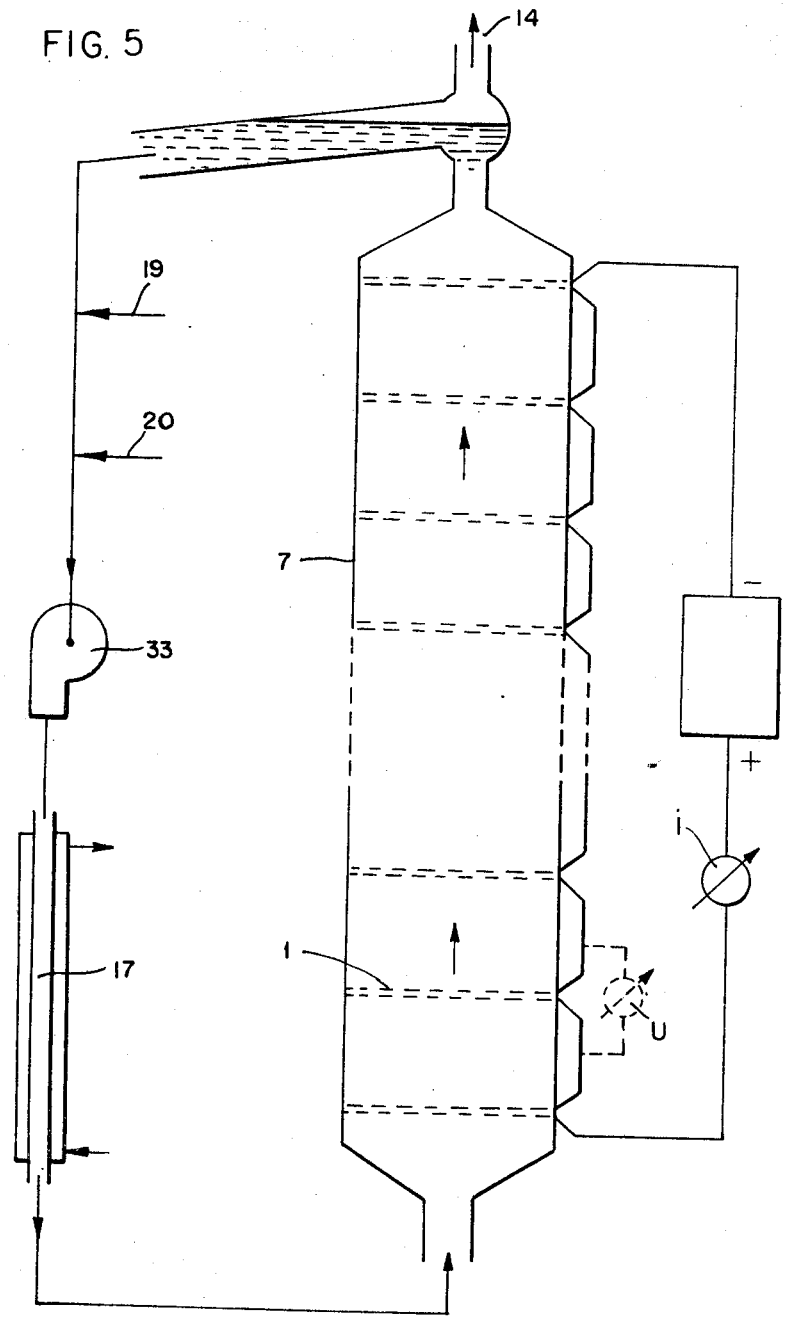
FIG. 5 is a continuous apparatus of the invention positioned vertically.

FIG. 4 illustrates details of the mounting of individual pairs of electrodes on the vibrator axis, when a large electrode area is required. The cathode of lead-covered iron wire 1a, the intermediate insulating layer (nonwoven glass fiber fabric) 22 and the self-supporting anode 1b consisting of expanded titanium metal coated with $PbO_2$ and electrically connected by sections of the axis 4. The grub screws 5 made of plastic hold the electrodes together in the center and the plastic screws 29 in the neighborhood of the periphery. The whole arrangement oscillates in a double jacket tube 7 having a cooling jacket 6 of steel coated with polyethylene. The internal insulation 30 (a layer of plastic) should make stray currents through the cell wall impossible. The hollow plastic members 31 ensure favorable distribution of the flow (rapid flow at the cooling surfaces and uniform flow through the pairs of electrodes) and relieve the vibrator axis by buoyancy action. The upward flow of the reaction mixture is caused by thermosyphonic action, disengagement of gas, pumping discs and if necessary by an additional pump in the external loop.

Figure 6:
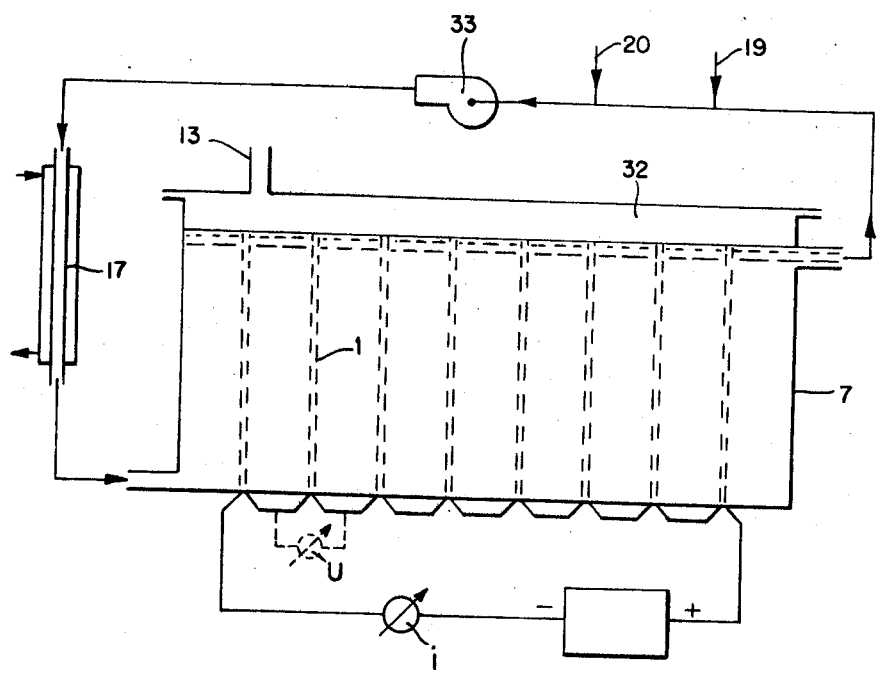
FIG. 6 is another continuous apparatus of the invention positioned vertically.

When a large amount of gas is disengaged at the anodes and/or cathodes, a vertical disposition of the pairs of electrodes according to FIG. 6 is favorable. The pairs of electrodes 1 are placed in a common electrolytic trough 7 and make a tight fit with the lateral walls and the base. Gas collects in space 32 and is withdrawn at 13. The reaction mixture is circulated by a pump 33, a heat exchanger 17 being interposed if necessary. The pairs of electrodes are shown connected in series. A parallel connection or a series-parallel connection is also possible.

A variety of electrochemical reactions, particularly reactions of organic compounds, may be carried out in the new apparatus, both anodic and cathodic reactions. It is self-evident however that it is only applicable to reactions in which the oxidation product does not react at the cathode or the reduction product at the anode. Particular advantages are achieved in anodic reactions in which the starting materials undergo little or no change at the cathode, and in cathodic reactions in which the starting materials undergo little or no change at the anode.

Examples of such electrochemical reactions are the anodic oxidation or substitution of aromatic and aliphatic hydrocarbons, carboxylic acids, sulfonic acids, carboxylic acid amides, esters, alcohols, amines, mercaptans and nitriles and the cathodic reduction of olefinically or aromatically unsaturated hydrocarbons, acids, esters, amides, nitriles and ketones and of aliphatic and aromatic ketones.

Even some reactions in which hitherto a diaphragm has been necessary to separate the anode space from the cathode space may be carried out in the new apparatus without any diaphragm. Examples of these are cathodic hydrodimerization of acrylonitrile to adiponitrile and anodic oxidation of $\beta$-hydroxypropionic acid to malonic acid.

In carrying out the electrochemical reaction, a current density is chosen which is necessary for the reaction in question. The cell voltage is however much lower than when using prior art apparatus although lower concentrations of electrolyte may be used. Voltage gains of 50 to 90% are possible.

In using the new apparatus it is possible to achieve the same current densities as in conventional methods with considerably smaller ion concentrations, for example smaller by a factor of 0.5 to 0.01, than when using prior art electrolytic apparatus, or at the same ion concentrations much higher current densities, for example higher by a factor of 2 to 20, may be used. Current densities in the range of 1 to 200, preferably 5 to 50, amperes per square decimeter are usually employed.

The composition of the electrolytes may be the same as in the conventional apparatus but the new apparatus permits the use in many cases of considerably lower ion concentrations and higher concentrations of organic compounds. As regards the qualitative composition of the reaction mixture, the pH value, the reaction temperatures and the pressure, there are no substantial differences from those in methods using prior art apparatus.

The new apparatus has proved to be particularly suitable for electrochemical hydrodimerization of acrylonitrile (known per se). Using the apparatus according to this invention, aqueous solutions containing acrylonitrile may be used whose acrylonitrile concentration may be within a wide range.

In general a reaction mixture is used which contains 5 to 98%, advantageously 20 to 98%, and particularly 40 to 90%, by weight of acrylonitrile. It is advantageous to use mixtures which form a homogeneous liquid phase. Both solutions of acrylonitrile in water and solutions of water in acrylonitrile may be used. The water content of the reaction mixture is in general from 1 to 94% by weight, preferably from 5 to 35% by weight.

Salts whose cations have a high deposition potential are used in the conventional way as conducting salts. The deposition potential (reduction potential) of the cations in 1 M aqueous solution should preferably be more negative than $-2.0$ volts (against the hydrogen standard electrode) at a current density of 10 amperes per square decimeter. Salts of quaternary ammonium bases are suitable for example. Alkali metal salts and alkaline earth metal salts may also be used because their deposition potential is displaced to negative values at low concentrations. Particularly suitable anions for these salts are those which cannot be oxidized or can only be oxidized with difficulty, such as sulfate, monoalkylsulfate, fluoride, tetrafluoroborate, fluorosulfonate and perchlorate anions. Examples of suitable conducting salts are tetraethyl ammonium ethyl sulfate, tetramethyl ammonium methyl sulfate, bis-tetraethyl ammonium sulfate, tetraethyl ammonium fluoride, triethyl carbethoxymethyl ammonium sulfate, tetramethyl ammonium fluorosulfonate, lithium sulfate, lithium perchlorate, sodium perchlorate, magnesium tetrafluoroborate and barium p-toluenesulfonate. Since tetraalkyl ammonium salts increase the hydrogen overvoltage of the cathode by specific adsorption thereon, it is advantageous to use mixtures of these salts with alkali metal or alkaline earth metal salts. Salts having anions whose oxidation potential is higher than that of the chloride ion are preferred.

In general a low concentration of conducting salt, for example from about 0.05 to 5% by weight, particularly from 0.1 to 1% by weight, is used. Because of this low concentration, relatively sparingly soluble salts may also be used, whereas in the prior art methods only a limited number of conducting salts may be used which have a high solubility in the electrolytes. The said sparingly soluble salts, such as sulfates and fluorides, moreover have the advantage that they are less expensive and/or at the same time give rise to secondary reactions to a less extent. Perchlorates may be used without risk at these low concentrations.

The conventional pH range of from 5 to 11, advantageously from 6 to 10, may be used. The required pH value may be set up for example by adding tertiary amines, cyclic secondary amines, quaternary ammonium bases, weak acids or buffer substances, and particularly weakly basic substances or weakly acidic substances whose cations are discharged only at high deposition potentials, such as tetraalkyl ammonium phosphates, acid alkylammonium sulfates, tetraalkyl ammonium hydroxides or alkylaryl ammonium hydroxides. It is preferred to use triethylamine, piperazine, morpholine, piperidine or aqueous about 3 M solutions of tetraethyl ammonium hydroxide or tetramethyl ammonium hydroxide. During the reaction the pH value is slowly shifted to lower values. If necessary the pH value is kept constant by metering in small amounts of bases during the reaction.

The reaction is in general carried out without further solvents or diluents but it is sometimes advantageous to coemploy polar solvents to set up a definite concentration of acrylonitrile or of water in the reaction mixture. Examples of suitable solvents are acetonitrile, dioxane, tetrahydrofuran, glycol monomethyl ether, diisopropyl ether, dimethylformamide, monomethylformamide and lower alcohols, such as methanol, ethanol or isopropanol. The solvent content of the electrolytes (when solvents are used) is in general from 2 to 30% by weight.

It is advantageous to add to the reaction mixture a small amount of a substance which is more easily oxidizable anodically than the conducting salt, acrylonitrile or adiponitrile. Anodic oxidation of the starting materials or reaction products occurring as secondary reaction and lessening the yield is thus suppressed. Examples of suitable substances are lower alcohols, particularly methanol, isopropanol, lower aldehydes and hydroxylamine. The substance is added to the reaction mixture advantageously in amounts of from 5 to 30% by weight. If the whole of the oxygen normally formed during the reaction is to be used up for oxidation of methanol, about 100 g. of methanol is required per kg. of adiponitrile.

The new method does not differ from the prior art methods as regards the material of the electrode. Cathodes having a high hydrogen overvoltage are used, for example of brass or iron coated with lead or cadmium, of copper coated with alloys of lead and thallium, which may also be amalgamated, or of amalgamated silver.

The anode material should as far as possible be insoluble and corrosion resistant. For example anodes of platinum, platinum-iridium, platinum-rhodium or platinized titanium or tantalum, also nickel cloth coated with lead dioxide or thallium oxide, and titanium cloth having a coating of titanium carbide or titanium nitrite may be used.

Surprisingly, when using electrodes according to this invention, the loss by anodic dissolution, particularly in the case of platinum, platinum-rhodium or platinum-iridium anodes, is substantially less than when using prior art apparatus.

In general current densities of 1 to 200, preferably 5 to 50 amperes per square decimeter, are used at cell voltages of 4.5 to 15 volts.

The reaction is usually carried out at atmospheric pressure at temperatures of from 0° to 50° C., particularly 25° to 35° C.

When oscillating electrodes are used, the reaction may proceed in a quasi-stationary condition because adequate conveyance will be effected by the oscillatory motion particularly when pump discs are used. An amount of reaction mixture equivalent to the amount supplied is supplied to processing whether the process be carried out quasi-stationarily or whether with reflux or recycling, and the residence times are chosen so that a conversion of from 10 to 60%, preferably between 15 and 30%, is achieved. Loss of product by anodic oxidation is thus avoided.

Processing of the reaction mixture may be carried out in a conventional manner for example by selective extraction of the organic substances with a suitable solvent or by extracting the conducting salt from the reaction mixture with water, followed by fractional distillation of the organic phase. Owing to the low salt content of the electrolytes, processing may be carried out considerably more simply than in prior art methods because the reaction mixture can be distilled without separation of the conducting salt. The conducting salt may be recovered from the distillation residue or from the aqueous solutions in the conventional manner. It is an advantage of the process that even when using acrylonitrile solutions containing only a small amount, for example less than 5% of water, the amount of polymerized acrylonitrile is nil or at the most only a negligible quantity.

The invention is illustrated by the following examples.

EXAMPLE 1

This example describes, as a cathodic reaction, the electrochemical hydrodimerization of acrylonitrile to acrylonitrile to adiponitrile which proceeds according to the empirical equation as follows:

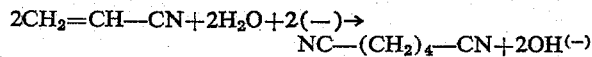

$$2CH_2=CH-CN+2H_2O+2(-) \rightarrow NC-(CH_2)_4-CN+2OH^{(-)}$$

The cathode in apparatus according to the invention is square-mesh brass cloth having 400 openings per sq. cm. which has been coated galvanically with lead (35 microns layer thickness) and then amalgamated. The anode is platinum-iridium (90/10%) cloth of the same size having 1024 apertures per sq. cm. A coarse porous glass fiber paper 0.1 mm. in thickness is placed between the two cloths. The pair of electrodes thus composed is clamped horizontally in a cell of polyethylene, the cathode being uppermost. Two cruciform templates of titanium sheet having a thickness of 1 mm. are laid on the outer sides of the cloths and ensure the maintenance of a minimum spacing between the cloths. Reaction mixture flows upwardly through the arrangement during the electrolysis being conveyed by a KPG centrifugal pump. The free electrode surface is 0.85 square decimeter.

A water cooled condenser, a thermometer, a glass electrode and a dropping funnel containing triethylamine are provided in the pump circuit. The anode offgas is discharged through a brine-cooled condenser.

At the beginning of the electrolysis, 1000 g. of a mixture of 81.5% by weight of acrylonitrile, 10% by weight of methanol, 8% by weight of water and 0.5% by weight of tetramethyl ammonium methyl sulfate is placed in the reactor. Electrolysis is carried out at a current strength of 17.0 amperes (equivalent to a current density of 20 amperes per square decimeter) at 30° C. and a pH value of 7. A total of 7 g. of triethylamine is supplied for pH regulation during the electrolysis. The cell voltage at the beginning is 7.5 volts, in the middle 7.8 volts and at the end of the electrolysis period 8.0 volts. After 4.86 hours, equivalent to a theoretical current conversion of 20.0%, electrolysis is discontinued. The electrolysis product is worked up by washing with 100 g. of water and fractional distillation of the organic phase. Gas chromatographic analysis gives the following yields of materials on the acrylonitrile reacted:

70% of adiponitrile (ADN)
5% of propionitrile
0.8% of bis-β-cyanoethylether
0.4% of β-hydroxypropionitrile
0.6% of succinonitrile
3.6% of other substances
19.6% of polymers.

The current yields are:

80% as regards adiponitrile
11.4% as regards propionitrile.

At a mean cell voltage of 7.8 volts, the energy consumption may be calculated as 4.84 kwh./kg. of ADN. The space-time yields under these conditions are 22 g. ADN/lh on the total volume of the reaction mixture or 32 kg./lh on the volume between the anode and cathode.

For comparison, the results of an experiment will be given which is carried out in a classic electrolytic cell having a diaphragm.

The cathode is horizontally disposed amalgamated lead plate (area=0.42 sq. dm.), the anode is a platinum cloth of the same size secured parallel thereto. The two electrodes are separated from each other by a diaphragm in the form of a cation exchanger membrane in the H(+)

form having a thickness of 0.8 mm. The distance of the cathode from the diaphragm is 7 mm. to make possible an adequate longitudinal flow at the cathode. The distance between the anode and the diaphragm is 2 mm. At the beginning of the electrolysis 500 g. of a mixture of 65% by weight of acrylonitrile, 14% by weight of water, 7% by weight of methanol and 14% by weight of tetraethyl ammonium ethyl sulfate is placed in the cathode space. 150 g. of 2% aqueous sulfuric acid is placed in the anode space. Electrolysis is carried out at a current strength of 8.4 amps, equivalent to a current density of 20 amps per sq. dm. at 35° C. and pH 8. The cell voltage is 19 volts. After a theoretical current conversion of 20% the electrolysis is discontinued. The product is worked up by combined water and toluene extraction and by fractional distillation of the organic phase. The following yields of material are obtained, with reference to reacted acrylonitrile:

83% of adiponitrile (ADN)
3.4% of propionitrile
1.0% of bis-β-cyanoethyl ether
0.3% of β-hydroxypropionitrile
2.5% of other substances and
9.8% of polymers.

The current yields are:

85% with regard to adiponitrile (ADN)
7.0% with regard to propionitrile.

At the said cell voltage, an energy consumption of 11.1 kwh./kg. of ADN is calculated. The space-time yields under these conditions are 26 g. of ADN per $l \times h$ on the total volume of electrolyte and 0.34 kg. of ADN per $l \times h$ on the volume between the anode and cathode.

EXAMPLE 2

The electrochemical condensation (Kobe synthesis) of monomethyl adipate (MA) to dimethyl sebacate (DS) is described as an example of anodic reaction; it proceeds according to the equation:

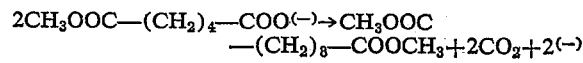

The anode used is a circular platinum/iridium (90/10%) cloth having 250 meshes per sq. cm. It is clamped in a polyvinyl chloride frame with a nickel cloth of the same size and same number of meshes which serves as cathode. Coarse-pored glass fiber paper or a fine meshed Perlon cloth having a thickness of 0.1 mm. is placed between the two electrodes. The arrangement, which has a free surface of 30 sq. cm., is immersed vertically in the reaction mixture which is in a cylindrical glass vessel. Since in this case there is vigorous evolution of gas at both electrodes during electrolysis, it is not necesary to pump the reaction mixture through the system in this case.

At the beginning of the electrolysis, 600 g. of a reaction mixture which has been prepared by slowly dripping 81 g. of 30% by weight solution of sodium methylate in methanol into a mixture of 240 g. of MA and 279 g. of methanol is filled into the reaction vessel. The mixture thus contains 40% of MA neutralized to the extent of 30%. A current of 6.0 amperes ($j=20$ amperes per sq. dm.) is passed through the arrangement for five hours and thirty minutes at a temperature of 35° C. Another 50 g. of MA is dripped in during the electrolysis. The pH value at the beginning of the electrolysis is 6.2 and at the end 7.5. The theoretical current conversion in respect of free MA is 90%. The cell voltage is 11 volts.

The product of the electrolysis is worked up by extraction with hexane, treatment of the hexane phase with molar sodium bicarbonate solution until disengagement of gas ($CO_2$) ceases, removal of the hexane and gas chromatographic analysis of the residue. The yield of DS is found to be 74.6% on reacted MA. The current yield is 55.3%. The calculated energy consumption is 4.62 kwh./kg. of DS. The space time yields under these conditions are 22 g. per $l \times h$ on the total volume of the reaction mixture and 4.7 kg. per $l \times h$ on the volume between the anode and cathode.

For comparison the result of an analogous experiment is given which is carried out in a classic electrolytic cell in which a square sheet platinum anode is located vertically between two sheet nickel cathodes. The distance between the anode and each cathode is 7 mm. The cell voltage at a current density of 20 amperes per sq. dm. when operating in this way is 26 volts. Material and current yields of DS are 75% and 48%. Energy consumption is thus 12.5 kwh./kg. of DS. Space time yields according to the above definition are 19 g. and 0.59 kg. per $l \times h$.

EXAMPLE 3

A pair of electrodes is disposed horizontally in an electrolytic cell of glass (see FIG. 3) provided with a polyethylene cover 21. The pair of electrodes consists of a circular cathode cloth 1a (brass wire cloth having 1500 meshes per sq. cm. having a galvanically deposited lead layer of 30 microns which has been amalgamated) and an anode cloth 1b of the same size (platinum-rhodium alloy (90/10) having 1024 meshes per sq. cm.), the cathode and anode being insulated from each other by a coarsely porous glass fiber paper 22 having a thickness of 0.1 mm. The two cloths are pressed together by two polypropylene members 3 shaped like spoked wheels (see FIG. 1) and secured to the lower end of a vibrator axis 4.

The cloth is electrically connected through the metal sleeve 2 with the vibrator axis 4 acting as an electric lead and with the flexible lead 11. The vibrator axis 4, which is connected to a vibrator 23 (100 cycles per second, 40 watts), is passed into the cell through a rubber membrane 24 with which it makes a gastight fit. The apparatus is also provided with a glass electrode 25, a thermometer 26, a dropping funnel 27 and an offgas pipe through a reflux condenser 28. The cell is stood in a waterbath (not shown) through which tap water flows for cooling.

At the beginning of the electrolysis, 500 g. of a mixture containing 66% by weight of acrylonitrile, 20% by weight of dioxane, 8% of water, 5% of methanol and 1% of tetramethyl ammonium methyl sulfate, is filled into the cell. The vibrator is operated with an amplitude of 0.5 mm. A stable pH value of 8.2 is maintained by gradual addition of 0.5 g. of glacial acetic acid and 1.5 g. of triethylamine through the dropping funnel 26.

Electrolysis is carried out at a current strength of 6.0 amperes, equivalent to a current density of 25 amperes per sq. dm. with reference to the uncovered cloth surface of 24 sq. cm. The pH value is kept constant during the electrolysis by adding a total of 8 g. of triethylamine. The temperature is 25° C. The cell voltage is 7.5 at the beginning of the electrolysis, 7.5 volts after one hour, 7.4 volts after two hours, 7.4 volts after three hours and 7.4 volts after three hours thirty minutes. Electrolysis for three hours thirty minutes is equivalent to a theoretical conversion of 12.5% on the acrylonitrile used.

The reaction mixture is worked up by washing with 100 g. of water and fractional distillation of the organic phase.

The yields, on reacted acrylonitrile, are: 62.3% of adipodinitrile, 11.8% of propionitrile and 13.6% of residue. The current yields are 62% on adipodinitrile and 24% on propionitrile.

If the same experiment be carried out at pH 7.3, the yields are 61.2% of adiponitrile, 13.8% of propionitrile and 15.6% of residue. The current yield is 61% on adiponitrile and 27% on propionitrile.

EXAMPLE 4

500 g. of mixture consisting of 71% by weight of acrylonitrile, 20% of dioxane, 8% of water and 1% of tetraethyl ammonium p-toluene sulfonate is filled into the apparatus according to FIG. 3 described in Example 3. Electrolysis is carried out at a current strength of 6 amps equivalent to a current density of 25 amps/sq. dm. at 25° C. and pH 8. The cell voltage is 8.1 volts at the beginning of the electrolysis, 8.0 volts after two hours and 7.9 volts after four hours. A four-hour electrolysis is equivalent to a theoretical conversion of 13.3%. The reaction mixture is worked up as in Example 3. The following yields are obtained with reference to reacted acrylonitrile: 60.0% of adiponitrile, 2.1% of propionitrile, 3.5% of $\beta,\beta'$-bis-cyanoethyl ether and 26.6% of residue. The current yields are 80% on adiponitrile and 6% on propionitrile.

EXAMPLE 5

400 g. of a mixture consisting of 81.5% by weight of acrylonitrile, 10% of methanol, 8% of water and 0.5% of tetramethyl ammonium methosulfate is filled into the electrolytic cell according to FIG. 3 described in Example 3. Electrolysis is carried out at a current strength of 6 amps, equivalent to a current density of 20 amps/sq. dm. at 30° C. and a pH value of 8.5. The cell voltage is 8.3 volts at the beginning of the electrolysis, 8.2 volts after three hours and 8.0 volts after five hours and twenty minutes. Electrolysis for five hours is equivalent to a theoretical conversion of 19.4% on acrylonitrile. A total of 4.0 g. of triethylamine is added during electrolysis to keep the pH value constant. The reaction mixture is worked up as described in Example 3. The following yields are obtained on reacted acrylonitrile: 62.5% of adiponitrile, 9.3% of propionitrile, 0.3% of $\beta,\beta'$-bis-cyanoethyl ether and 20.6% of residue. The current yield of 61% in respect of adiponitrile and 18% in respect of propionitrile.

EXAMPLE 6

500 g. of a mixture consisting of 66% by weight of acrylonitrile, 20% of dimethylformamide, 5% of methanol, 8% of water and 1% of tetramethyl ammonium methyl sulfate is filled into an electrolytic cell according to FIG. 3 as described in Example 3. Electrolysis is carried out at a current strength of 6 amps, equivalent to a current density of 25 amps/sq. dm. at 25° C. and pH 8.0. The cell voltage at the beginning of the electrolysis is 8.7 volts, after two hours is 8.7 volts and after four hours also 8.7 volts. The theoretical conversion during four hours is 14.4% on the acrylonitrile used. The reaction product is worked up according to Example 3 and the following yields on reacted acrylonitrile are obtained: 62.1% of adiponitrile, 6.2% of propionitrile, 2.3% of $\beta,\beta'$-bis-cyanoethyl ether, 0.4% of succinodinitrile and 14.7% of residue. The current yields are 67% on adiponitrile and 13% on propionitrile.

EXAMPLE 7

400 g. of a mixture consisting of 76.5% by weight of acrylonitrile, 15% by weight of methanol, 8% by weight of water and 0.5% by weight of tetramethyl ammonium methyl sulfate is placed in the electrolytic cell according to FIG. 3 described in Example 3. The pair of electrodes in this example is however moved to and fro with a frequency of only 20 cycles per second by means of an eccentric, the amplitude being 1 mm. Electrolysis is carried out at a current strength of 7 amps, equivalent to a current density of 20 amps/sq. dm. at 35° C. and a pH of 7.5. The pH value is kept constant by adding 7 g. of 2.8 M aqueous solution of tetraethyl ammonium hydroxide during electrolysis.

The cell voltage is 10 to 9 volts. After 4.42 hours (i.e., after a theoretical current conversion of 20.0%) the electrolysis is discontinued.

The reaction product is worked up as in Example 3 and the following yields are obtained on reacted acrylonitrile: 63.0% of adiponitrile, 9.7% of propionitrile and 19.0% of residue. The current yield is 36% as regards adiponitrile and 15% as regards propionitrile.

EXAMPLE 8

The electrolytic cell described in Example 3 is used but the platinum-rhodium cloth anode is provided by anodic deposition with a layer of $\beta$-lead dioxide having a thickness of 24 microns. At the beginning of the experiment, a mixture of 96% by weight of acrylonitrile, 3.5% by weight of water and 0.5% by weight of tetramethyl ammonium methosulfate is filled into the cell. Electrolysis is carried out at a current strength of 6 amps, equivalent to a current density of 20 amps/sq. dm. at 40° C. and a pH value of 7.0. The pH value is kept constant during the electrolysis by adding 6 g. of triethylamine. The cell voltage is 5.4 to 7.5 volts. After 6.47 hours (equivalent to a theoretical current conversion of 20.0%) the electrolysis is discontinued. The product is worked up as in Example 3. The following yields are obtained on the acrylonitrile reacted: 62.3% of acrylonitrile, 15.0% of propionitrile and 17.0% of residue. The current yields are 52% as regards adiponitrile and 25% as regards propionitrile. The anode coated with lead dioxide is unchanged after the experiment.

EXAMPLE 9

400 g. of a mixture of 81.5% by weight of acrylonitrile, 10% by weight of methanol, 8% by weight of water and 0.5% by weight of tetramethyl ammonium methosulfate is placed in the electrolytic cell described in Example 3 having a lead dioxide anode according to Example 6. Electrolysis is carried out at a current strength of 18 amps, equivalent to a current density of 60 amps/sq. dm. at 35° C. and a pH value of 7.5. The cell is placed in a bath of ice-water for cooling. By adding 5 g. of triethylamine during electrolysis, the pH value is kept constant. The cell voltage is 10.5 to 10 volts. The electrolysis is discontinued after 1.92 hours, equivalent to a theoretical current conversion of 20.9%. The product is worked up as in Example 3. The following yields are obtained on reacted acrylonitrile: 64.0% of adiponitrile, 20.9% of propionitrile and 8.1% of residue. The current yields are 53% on adiponitrile and 34% on propionitrile. The anode coated with lead dioxide is unchanged after the experiment.

EXAMPLE 10

400 g. of a mixture of 72.5% by weight of acrylonitrile, 20% by weight of isopropanol, 7% by weight of water and 0.5% by weight of tetramethyl ammonium methyl sulfate is filled into the electrolytic cell described in Example 3 with the lead dioxide anode described in Example 6. Electrolysis is carried out at a current strength of 6 amps, equivalent to a current density of 20 amps/sq. dm. at 35° C. and a pH value of 8.5. The pH value is kept constant during the electrolysis by adding 9 g. of a 2.6 M aqueous solution of tetraethyl ammonium hydroxide. The cell voltage is 5.9 to 6.1 volts. After 4.90 hours, equivalent to a theoretical current conversion of 20.0%, the electrolysis is discontinued. The product is worked up as in Example 3. The following yields are obtained with reference to reacted acrylonitrile: 78.0% of adiponitrile, 1.7% of propionitrile and 15.7% of residue. The current yields are 87% with respect to adipodinitrile and 4% with respect to propionitrile. The anode coated with lead dioxide is unchanged after the experiment.

EXAMPLE 11

The procedure described in Example 1 is followed but no circulating pump is used to convey the reaction mixture through the electrodes. Instead a piston which is movably arranged with a liquid-tight fit in a cylinder is provided in the lower part of the electrolytic cell. The pulsating movements of the piston for transmitting movement to the electrolyte have a frequency of 20 cycles per second. In the locality of the pair of electrodes, the amplitude of the pulsations of the liquid is 3 mm. Under the conditions described in Example 1, identical current and material yields are obtained with this modified arrangement.

EXAMPLE 12

The electrolytic cell (see FIG. 3) used in Example 3 is employed using a pair of electrodes of which the cathode is a brass cloth coated with lead and slightly amalgamated (400 meshes per sq. cm.) and the anode is a platinized, flattened titanium expanded metal (0.3 mm. in thickness) coated with a layer of β-lead dioxide 24 microns in thickness (13 meshes per sq. cm.; platinum deposit, 8 microns in thickness). The electrodes are separated by a non-woven glass fiber cloth having a thickness of 0.15 mm. At the beginning of the electrolysis, a mixture of 72.5% by weight of acrylonitrile, 20% by weight of isopropanol, 7% by weight of water and 0.5% by weight of tetramethyl ammonium methyl sulfate is placed in the cell. Electrolysis is carried out under the following condition: $j=20$ amps/sq. dm. ($i=7$ amps); 35° C.; pH 7.5, controlled with tetraethyl ammonium hydroxide, consumption 0.6 millimole per ampere hour; conversion 20%. The cell voltage during electrolysis is 7.5 volts. The material yields are: adiponitrile 83%, propionitrile 4%. The current yields are: adiponitrile 70%, propionitrile 6%. The lead oxide layer on the anode is unchanged after the electrolysis.

EXAMPLE 13

Results of a continuous method with an uninterrupted operation lasting 190 hours will be illustrated. Six pairs of electrodes having a diameter of 88 mm. and spaced 100 mm. apart which are connected in series are mounted on a common vibrator axis made of titanium (see FIG. 2). The individual pairs of electrodes are made up as follows: brass cloth, 400 meshes per sq. cm., coated galvanically with lead and slightly amalgamated as cathode; nonwoven glass fiber cloth, 0.15 mm. in thickness, impregnated with 1% Teflon dispersion, as intermediate layer; platinum-rhodium (90/10) cloth, 1024 meshes per sq. cm., coated with β-lead dioxide in a thickness of 24 microns, as anode. The composition of the reaction mixture is: 70% by weight of acrylonitrile, 22.5% by weight of isopropanol, 7% by weight of water, and 0.5% by weight of tetramethyl ammonium methyl sulfate. Electrolysis conditions: $i=8$ amps, equivalent to $j=20$ amps/sq. dm., pH value 7, 35° C. A total voltage of 51 volts is set up, equivalent to a voltage of 8.5 volts per pair of electrodes. Frequency of the vibrator is 50 cycles per second and the amplitude is 1.1 mm. The theoretical current conversion is 30% and is achieved after an initial period of 18.8 hours. Thereafter it is kept constant by metering in 0.45 kg. of reaction mixture per hour and by continuous removal of an equal amount from the circulation. Consumption of tetraethyl ammonium hydroxide (as a 1.7 M aqueous solution) is 0.56 millimole per ampere hour during an electrolysis.

The product of the electrolysis is worked up by direct distillation in a film evaporator followed by distillation of the bottoms under subatmospheric pressure (3 mm. Hg, 136° C.). Adiponitrile obtained in this way has a purity of 98.9%. It is further purified by continuous crystallization (purity better than 99.9%). Materials yields are: adiponitrile 80%, propionitrile 2%; current yields are: adiponitrile 67%, propionitrile 3.5%. The electrodes are unchanged after operation for 190 hours.

We claim:

1. An electrolytic cell for carrying out electrochemical reactions of organic compounds in the liquid phase of an electrolyte, said cell comprising at least one pair of generally planar liquid-permeable electrodes arranged within said cell, means for repeatedly passing a liquid electrolyte transversely through said electrodes, the anode and cathode members of said electrode pair having oppositely disposed parallel planar surfaces which are uniformly spaced apart by a distance of less than 1 mm.

2. Apparatus as claimed in claim 1 wherein the electrodes in a pair of electrodes are separated from each other by a liquid permeable insulator.

3. Apparatus as claimed in claim 1 wherein said means for repeatedly passing the electrolyte transversely through the electrodes includes pump means to continuously circulate the electrolyte for flow in only one direction transversely through each pair of electrodes.

4. Apparatus as claimed in claim 1 wherein said means for repeatedly passing the electrolyte transversely through the electrodes includes oscillating means to impart a pulsating flow of the electrolyte transversely back and forth through each pair of electrodes.

5. Apparatus as claimed in claim 4 comprising means for imparting pulsations to the electrolyte.

6. Apparatus as claimed in claim 4 comprising means for imparting pulsating movement to the electrodes.

7. Apparatus as claimed in claim 1 comprising from two to one hundred pairs of electrodes.

8. An electrolytic cell as claimed in claim 1 wherein the oppositely disposed surfaces of said anode and cathode members are spaced apart by a distance of from 0.02 to 0.5 mm.

9. An electrolytic cell as claimed in claim 1 wherein the oppositely disposed surfaces of said anode and cathode members are spaced apart by a distance of from 0.05 to 0.2 mm.

10. An electrolytic cell as claimed in claim 1 wherein said cell contains a plurality of electrode pairs and the ratio of the spacing between said anode and cathode members to the spacing between adjacent pairs of electrodes is about 1:100 to 1:1000.

11. An electrolytic cell as claimed in claim 1 wherein each electrode pair is disposed substantially perpendicularly to the axis of said cell corresponding to the direction of flow of the liquid electrolyte, and each electrode has a substantially flat, fine-mesh screen structure.

12. Apparatus as claimed in claim 1 wherein said cell comprises a tubular conduit for the electrolyte containing a plurality of said paired electrodes with their planar surfaces substantially perpendicular to the axis of the tubular conduit and arranged at spaced intervals along said axis, inlet means to supply electrolyte at one end of said conduit, outlet means to withdraw electrolyte at the other end of said conduit, and means to recirculate at least a portion of said electrolyte from said outlet to said inlet means.

13. Apparatus as claimed in claim 12 wherein said cell includes oscillating means to impart a pulsating flow to the electrolyte transversely back and forth through each pair of electrodes and also pump means to continuously recirculate the electrolyte through the tubular conduit.

References Cited

UNITED STATES PATENTS

| 2,816,067 | 12/1967 | Keidel | 204—130 |
| 1,225,052 | 5/1917 | Piguet | 204—275 XR |
| 1,544,052 | 6/1925 | Avery | 204—275 XR |
| 2,071,260 | 2/1937 | Holden | 204—222 |
| 2,919,235 | 12/1959 | Roller | 204—273 XR |
| 3,342,718 | 9/1967 | Adams | 204—273 |
| 3,379,634 | 4/1968 | Rutkowski | 204—269 XR |

FOREIGN PATENTS

| 895,761 | 11/1953 | Germany. |
| 730,231 | 3/1966 | Canada. |

JOHN H. MACK, Primary Examiner

D. R. VALENTINE, Assistant Examiner

U.S. Cl. X.R.

204—73, 237, 261, 263, 283